United States Patent
Byun et al.

(10) Patent No.: US 9,850,854 B2
(45) Date of Patent: Dec. 26, 2017

(54) METHOD FOR CONTROLLING ENGINE OF VEHICLE TO ENSURE A STABLE DRIVING STATE OF ENGINE ON ELECTRICAL FAILURE OF PURGE CONTROL SOLENOID VALVE

(71) Applicant: Hyundai Motor Company, Seoul (KR)

(72) Inventors: Jung Sup Byun, Yongin-si (KR); Seong Kyu Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 290 days.

(21) Appl. No.: 14/686,144

(22) Filed: Apr. 14, 2015

(65) Prior Publication Data
US 2016/0123279 A1 May 5, 2016

(30) Foreign Application Priority Data

Oct. 30, 2014 (KR) .................... 10-2014-0149224

(51) Int. Cl.
| | |
|---|---|
| *G01M 15/04* | (2006.01) |
| *F02M 25/08* | (2006.01) |
| *F02D 41/02* | (2006.01) |
| *F02D 41/22* | (2006.01) |
| *F02D 41/24* | (2006.01) |
| *F02D 41/00* | (2006.01) |

(52) U.S. Cl.
CPC ....... *F02M 25/0809* (2013.01); *F02D 41/004* (2013.01); *F02D 41/0205* (2013.01); *F02D 41/221* (2013.01); *F02D 41/2403* (2013.01); *F02D 2041/227* (2013.01); *F02M 2025/0845* (2013.01); *Y02T 10/40* (2013.01)

(58) Field of Classification Search
USPC .................................................. 73/114.39
See application file for complete search history.

(56) References Cited

U.S. PATENT DOCUMENTS

| | | | | |
|---|---|---|---|---|
| 5,857,447 A | * | 1/1999 | Shinohara | .......... F02M 25/0809 123/520 |
| 2004/0250805 A1 | * | 12/2004 | Osanai | .................. F02D 41/004 123/698 |

(Continued)

FOREIGN PATENT DOCUMENTS

| | | |
|---|---|---|
| JP | 2005-233147 A | 9/2005 |
| JP | 2007-247455 A | 9/2007 |

(Continued)

*Primary Examiner* — Eric S McCall
(74) *Attorney, Agent, or Firm* — Morgan, Lewis & Bockius LLP

(57) ABSTRACT

A method for controlling an engine for a vehicle to ensure a stable driving state of the engine on an electrical failure of a Purge Control Solenoid Valve (PCSV) may include determining, by a controller, whether a situation of an electrical failure where an opening state of the Purge Control Solenoid Valve (PCSV) is held is detected, increasing, by the controller, a failure detecting counter to a first reference value according to a state where the situation of the electrical failure of the PCSV has been detected is kept as a result of performing the failure detecting, and compensating, by the controller, a rotation number of the engine to increase the rotation number of the engine when the failure detecting counter exceeds the first reference value as a result of performing the increasing.

7 Claims, 3 Drawing Sheets

(56) References Cited

U.S. PATENT DOCUMENTS

2008/0135025 A1\* 6/2008 Mc Lain ............. F02D 41/0035
123/520
2015/0361929 A1\* 12/2015 Tamura ............. F02M 25/0809
73/114.39

FOREIGN PATENT DOCUMENTS

| KR | 1998-060476 A | 10/1998 |
|---|---|---|
| KR | 10-2004-0049337 A | 6/2004 |
| KR | 10-2005-0071157 A | 7/2005 |
| KR | 10-2013-0030089 A | 3/2013 |
| KR | 10-1251090 B1 | 4/2013 |

\* cited by examiner

METHOD FOR CONTROLLING ENGINE OF VEHICLE TO ENSURE A STABLE DRIVING STATE OF ENGINE ON ELECTRICAL FAILURE OF PURGE CONTROL SOLENOID VALVE

CROSS-REFERENCE(S) TO RELATED APPLICATION

The present application claims priority to Korean Patent Application Number 10-2014-0149224 filed Oct. 30, 2014, the entire contents of which is incorporated herein for all purposes by this reference.

BACKGROUND OF THE INVENTION

Field of the Invention

The present invention relates to a method for controlling an engine of a vehicle, and more particularly, to a method for controlling an engine of a vehicle through which a stable driving state of an engine can be ensured when PCSV is failed electrically.

Description of Related Art

Generally, a Purge Control Solenoid Valve (PCSV) is opened/closed to supply fuel collected in a canister to an intake system of an engine to be burnt therein in which the opening/closing of PCSV is controlled with an electric control by a controller according to the conditions of an engine.

However, if a case where PCSV is failed electrically and stops in an opening state thereof, a phenomenon where excessive concentrate fuel is introduced into an engine and a start of an engine is shut-off may occur.

Of course, according to a related art, in a case where PCSV is failed electrically, a controller senses the failure and increase a failure detecting counter, and when the failure detecting counter exceeds to a predetermined level, the controller determines that PCSV is failed electrically.

However, as shown in FIG. 1, when a start of an engine is shut-off while an electrical failure of PCSV occurs and a failure detecting counter starts to increase, the failure detecting counter is not increased further since the engine is stopped, and at this state a controller does not determine that PCSV is failed electrically since the failure detecting counter is not increased to a predetermined level at which a controller needs to determine that PCSV is failed. After that, the failure detecting counter is increased again when a start of an engine is re-turned-on, and reaches to a predetermined level and then the controller senses that PCSV is failed.

That is, when an electric failure of PCSV occurs and PCSV is held in an opening state, it cannot prevent a start of an engine from being shut-off and it is possible to determine an electrical failure of PCSV even after the engine is re-started, even though it is configured such that a controller senses the electric failure of PCSV through the failure detecting counter. Accordingly, it cannot prevent harm to safety of an engine since the start of an engine is shut-off due to an electrical failure of PCSV.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling an engine for a vehicle through which a safety of a vehicle can be ensured by preventing a start of an engine from being shut-off when an opening state of a Purge Control Solenoid Valve (PCSV) is held due to an electrical failure.

According to various aspects of the present invention, a method for controlling an engine for a vehicle may include determining, by a controller, whether a situation of an electrical failure where an opening state of a Purge Control Solenoid Valve (PCSV) is held is detected, increasing, by the controller, a failure detecting counter to a first reference value according to a state where the situation of the electrical failure of the PCSV has been detected is kept as a result of performing the failure detecting, and compensating, by the controller, a rotation number of the engine to increase the rotation number of the engine when the failure detecting counter exceeds the first reference value as a result of performing the counter increasing.

The first reference value may be set to be smaller than a second reference value for determining the electrical failure of the PCSV.

The first reference value may be set as a predetermined level to which the failure detecting counter reaches before a start of an engine is shut-off due to the hold of the opening state of the PCSV.

A target rotation number of the engine may be increased to a predetermined level at which the turning-off of a start of the engine due to a concentrate mixing gas can be prevented in the rotation number compensation.

The method may further include, after starting to perform the rotation number compensation, confirming whether the electrical failure of PCSV is held, and when the failure is held, releasing the compensation of rotation number of the engine that has been compensated in the rotation number compensation.

The method may further include, as a result of performing the confirming, when the failure is not solved, confirming whether an air-fuel ratio of the engine is stabilized is performed, and as a result of performing the air-fuel ratio confirmation, when the air-fuel ratio is stabilized, releasing the compensation of the rotation number of the engine that has been compensated in the rotation number compensation.

The method may further include, after starting to perform the rotation number compensation, confirming whether the air-fuel ratio is stabilized and releasing the compensation of the rotation number of the engine that has been compensated in the rotation number compensation when the air-fuel ratio is stabilized as a result of performing the air-fuel ratio confirmation.

No compensation of the rotation number of the engine is performed when the situation of the electrical failure where the opening state of the Purge Control Solenoid Valve (PCSV) is held is not detected It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
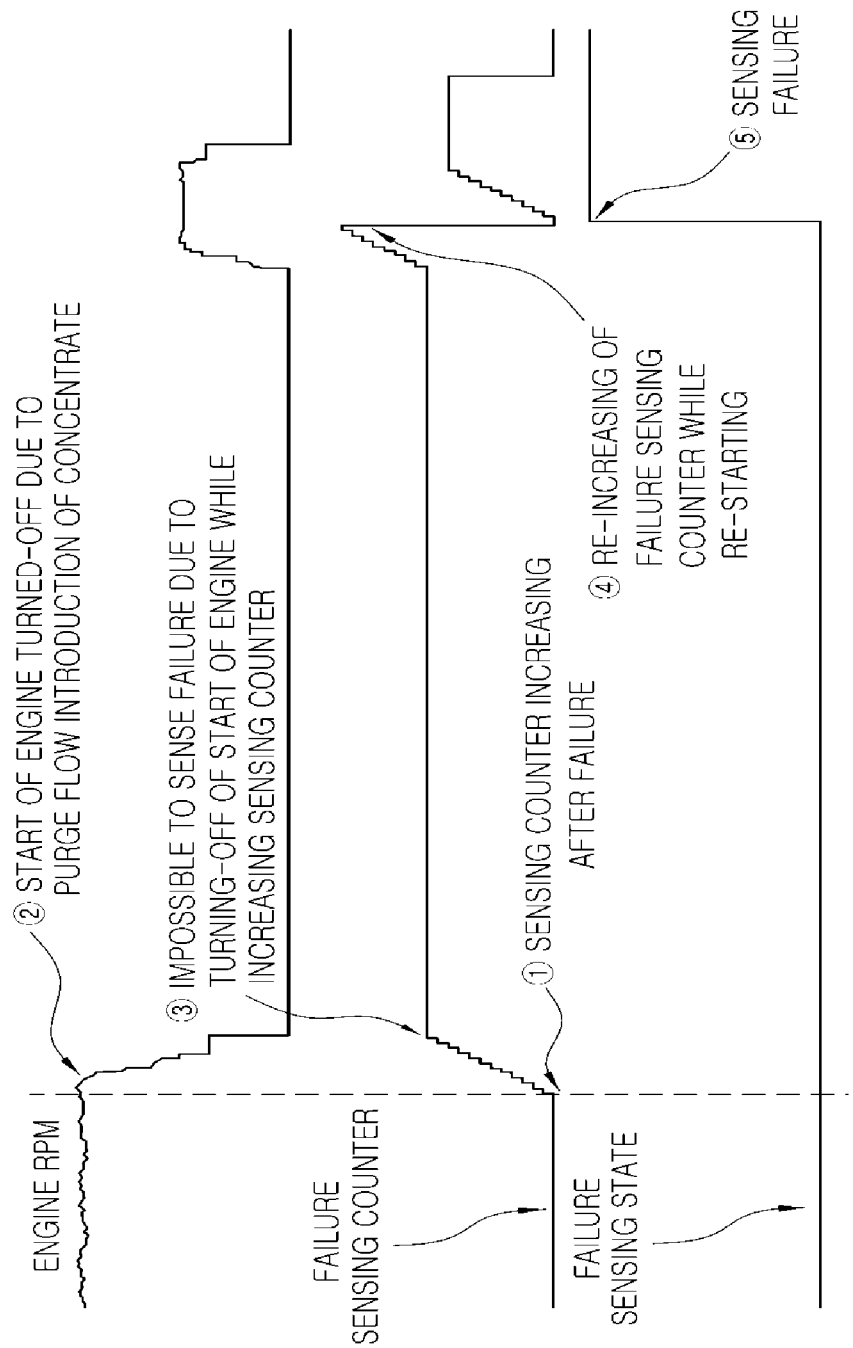
FIG. 1 is a graph illustrating a situation where a conventional Purge Control Solenoid Valve (PCSV) is failed.
Figure 2:
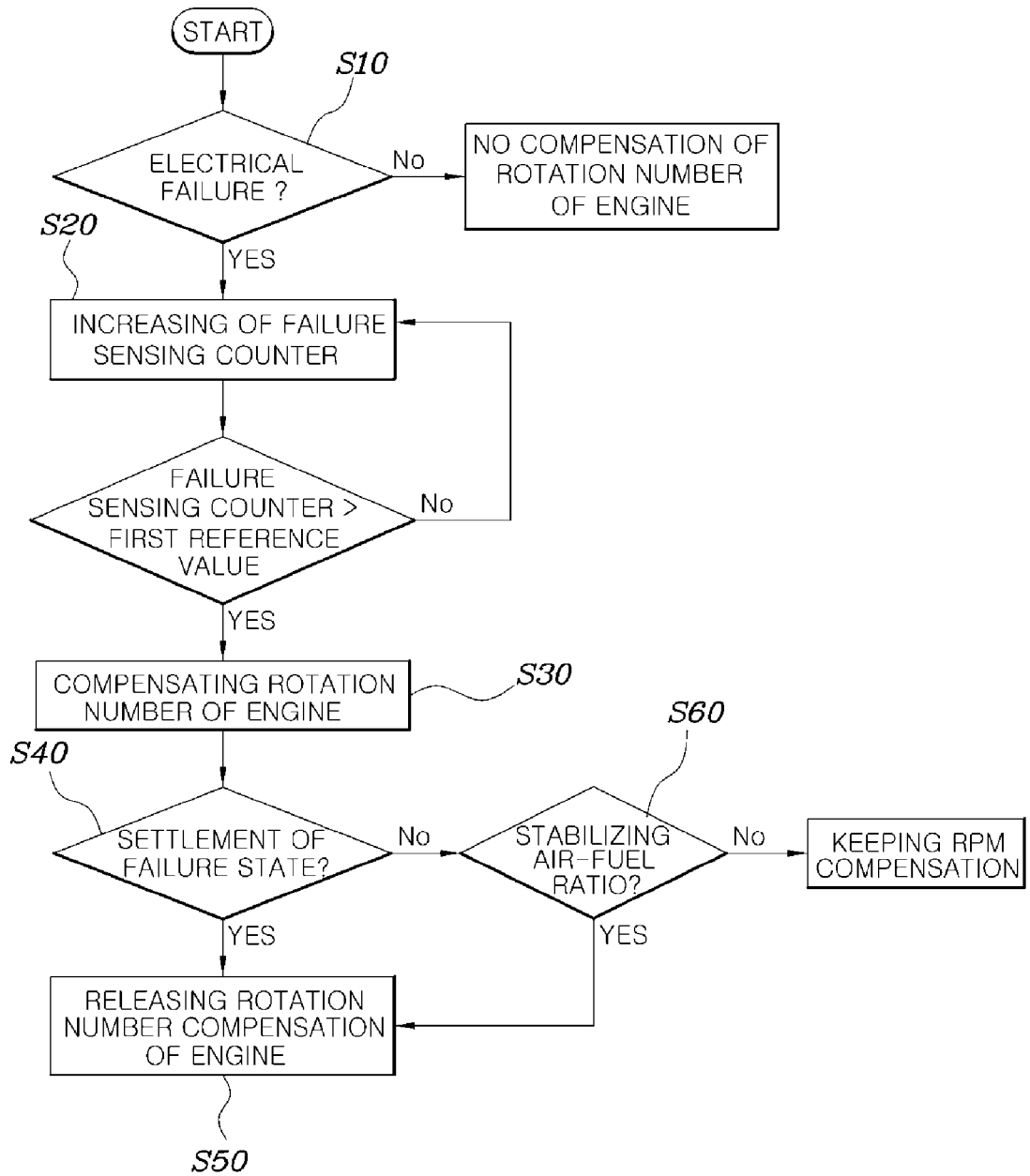
FIG. 2 is a flowchart illustrating an exemplary method for controlling an engine for a vehicle according to an exemplary embodiment of the present invention.

Referring to FIG. 2, various embodiments of a method for controlling an engine for a vehicle according to an exemplary embodiment of the present invention include the steps of: detecting a failure S10, for determining whether a situation of an electrical failure of a Purge Control Solenoid Valve (PCSV) where an opening state thereof is held is detected, S10, increasing counter S20, for increasing failure detecting counter to a predetermined first reference value according to a state where a situation of an electrical failure of PCSV is detected is kept, by performing the failure detecting step S10, determining whether the failure detecting counter exceeds a first reference value, and compensating the rotation number S30 for compensating the rotation number of an engine for a vehicle by increasing the rotation number when the failure detecting counter exceeds the first reference value by performing the failure counter increasing step S20.

The first reference value in the counter increasing step S20 is set as being smaller than a second reference value for determining an electrical failure of PCSV.

That is, when a situation where an electrical circuit of PCSV is short on a ground occurs, a controller for controlling PCSV increases automatically and instantly the failure detecting counter per a predetermined cycle that is set on the controller and then determines finally the failure of PCSV when the failure detecting counter reaches to a second reference value and takes action such as lighting a warning lamp or managing the failure. However, since the start of an engine may be shut-off before the failure detecting counter reaches to the second reference value, when the accumulation value of the failure detecting counter reaches to the first reference value prior to reaching to the second reference value, the rotation number of an engine is compensated to increase to a predetermined level so as to prevent a start of an engine from being turned-off, thereby improving safety of a vehicle by preventing the start of an engine from being shut-off due to an electrical failure of PCSV.

Accordingly, the first reference value may be set as a predetermined level to which the failure detecting counter reaches before a start of an engine is shut-off due to the hold of an opening state of PCSV. For this purpose, it needs a procedure for selecting previously a proper value through a plurality of experiments and analysis.

A target rotation number of an engine is increased to a predetermined level at which the turning-off of a start of an engine due to a concentrate mixing gas can be prevented in the rotation number compensation step S30.

For example, when the target rotation number of an engine is 800 RPM when the controller starts to sense the failure of PCSV, the target rotation number of an engine is set as 1000 RPM in the rotation number compensation step S30, so that even if the excessive concentrate fuel is supplied through PCSV, the fuel is burnt sufficiently, thereby preventing a start of an engine from being turned-off.

After starting to perform the rotation number compensation step S30, a step of confirming whether an electrical failure of PCSV is held S40 is further provided, and if the failure is held, a step of releasing the compensation of rotation number of an engine that has been compensated in the rotation number compensation step S30 S50 is further provided, so that a normal rotation number is recovered automatically when PCSV is failed temporally.

Further, as a result of performing the confirming step S40, if the failure is not solved, a step of confirming whether an air-fuel ratio of an engine is stabilized S60 is performed, and as a result of performing the air-fuel ratio confirming step S60, if the air-fuel ratio is stabilized, the compensation releasing step S50 for releasing the compensation of the rotation number of an engine that has been compensated in the rotation number compensation step S30 is performed.

Here, the confirming result of the air-fuel ratio of an engine that is obtained by an air-fuel ratio determination unit provided separately on a controller is used in the compensation releasing step such that even if a concentrate fuel is introduced due to a hold of an opening state of PCSV, fuel component introduction is reduced significantly as a canister is regenerated gradually and thus if the air-fuel ratio is stabilized after the rotation compensation step S30, the compensation releasing step S50 is performed even if the failure state of PCSV is not settled, thereby settling unnecessary increasing of the rotation number of an engine.

For reference, the air-fuel ratio determining unit uses a publicly known technology.

After starting to perform the rotation number compensation step S30, the step of confirming whether the air-fuel ratio is stabilized S60 and the step of releasing the compensation of the rotation number of an engine that has been compensated in the rotation number compensation step S30 when the air-fuel ratio is stabilized as a result of performing the air-fuel ratio confirming step S60 may be performed without performing the failure releasing confirming step S40 if it is not confirmed that the electrical failure of PCSV is settled.

Figure 3:
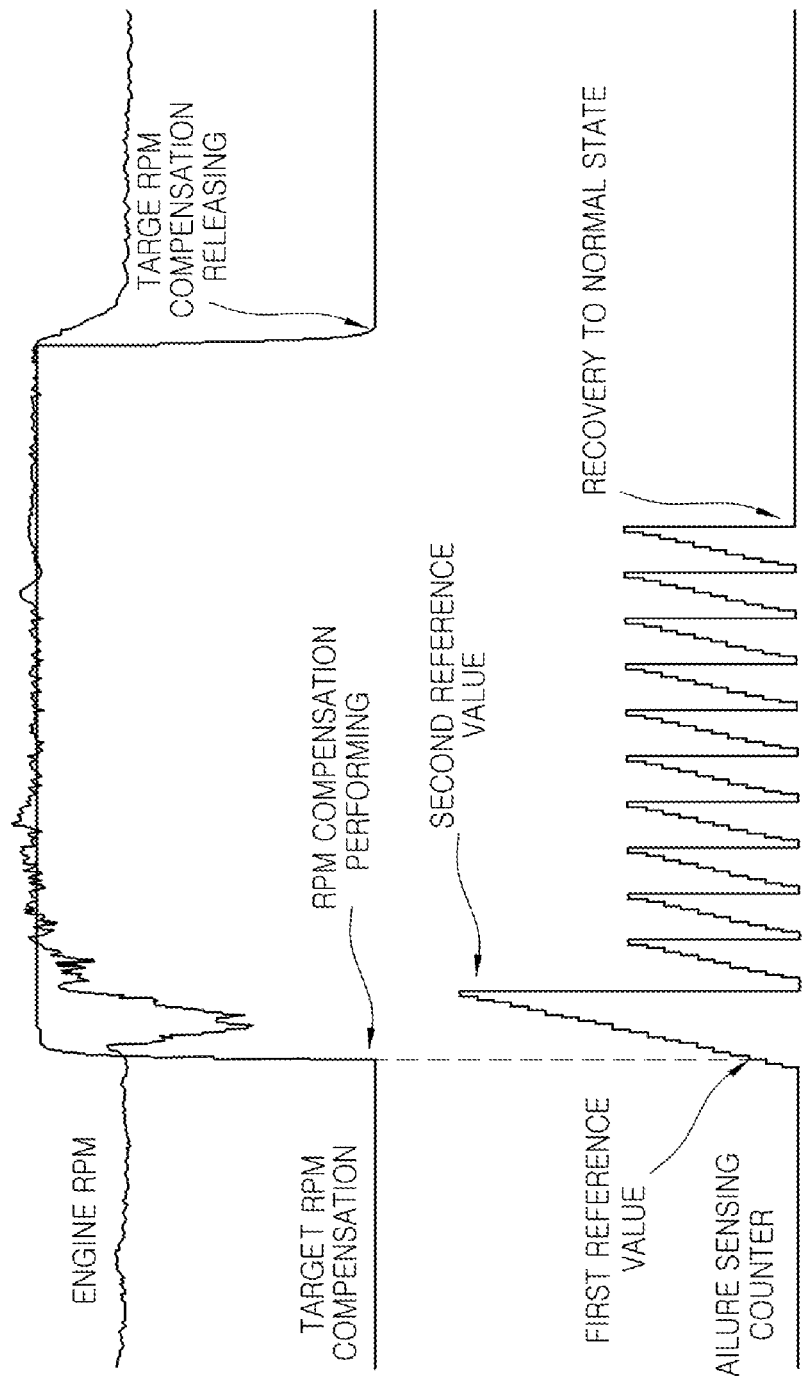
FIG. 3 is a graph illustrating the exemplary method for controlling the engine for the vehicle according to an exemplary embodiment of the present invention.

FIG. 3 is a graph illustrating a method for controlling an engine for a vehicle according to various embodiments of the present invention wherein when the failure detecting counter starts to increase and exceeds to a first reference value due to an electrical failure of PCSV, the target rotation number of an engine is compensated to increase the rotation number of an engine that has been decreased thereby to prevent a start of an engine from being turned-off. Here, when it is determined that PCSV is recovered to a normal state and the failure detecting counter is recovered to a normal state, the compensation of the rotation number of an engine is released to lower the rotation number of an engine to a normal level. For reference, a treatment of the air-fuel ratio confirming step S60 is omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an engine for a vehicle to ensure a stable driving state of the engine on an electrical failure of a Purge Control Solenoid Valve (PCSV), comprising:
    determining, by a controller, whether a situation of the electrical failure in which an opening state of the PCSV is held is detected;
    increasing, by the controller, a failure detecting counter to a first reference value, when the situation is still detected under the determining; and
    compensating, by the controller, a rotation number of the engine to increase the rotation number of the engine when an accumulated value of the failure detecting counter exceeds the first reference value under the increasing,
    wherein the first reference value is set to be smaller than a second reference value which is provided for determining the electrical failure of the PCSV.

2. The method for controlling the engine for the vehicle of claim 1, wherein the first reference value is set as a predetermined level to which the failure detecting counter reaches before the engine is shut-off due to a hold of the opening state of the PCSV.

3. The method for controlling the engine for the vehicle of claim 1, wherein a target rotation number of the engine is increased to a predetermined level at which the shut-off of the engine caused by a concentrate mixing gas is prevented by the compensating the rotation number.

4. The method for controlling the engine for the vehicle of claim 1, wherein no compensation of the rotation number of the engine is performed when the situation of the electrical failure where the opening state of the Purge Control Solenoid Valve (PCSV) is held is not detected.

5. The method for controlling the engine for the vehicle of claim 1, further comprising, after starting to perform the compensating the rotation number, confirming whether the electrical failure of PCSV is solved, and when the failure is solved, cancelling the compensation of the rotation number of the engine that has been compensated in the compensating the rotation number.

6. The method for controlling the engine for the vehicle of claim 5, further comprising, as a result of performing the confirming, when the failure is not solved, confirming whether an air-fuel ratio of the engine is stabilized, and as a result of performing air-fuel ratio confirmation, when the air-fuel ratio is stabilized, cancelling the compensation of the rotation number of the engine that has been compensated in the compensating the rotation number.

7. The method for controlling the engine for the vehicle of claim 6, further comprising, after starting to perform the rotation number compensation, confirming whether the air-fuel ratio is stabilized and cancelling the compensation of the rotation number of the engine that has been compensated in the compensating the rotation number when the air-fuel ratio is stabilized as a result of performing the air-fuel ratio confirmation.

* * * * *